United States Patent
Oh et al.

(10) Patent No.: US 10,194,145 B2
(45) Date of Patent: Jan. 29, 2019

(54) 3D DISPLAY DEVICE FOR REDUCING MOVING FLICKER

(71) Applicant: LG DISPLAY CO., LTD., Seoul (KR)

(72) Inventors: SeungTaek Oh, Seoul (KR); SeongHwan Ju, Paju-si (KR); TaeJoon Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 435 days.

(21) Appl. No.: 14/828,119

(22) Filed: Aug. 17, 2015

(65) Prior Publication Data

US 2016/0050410 A1 Feb. 18, 2016

(30) Foreign Application Priority Data

Aug. 18, 2014 (KR) .................. 10-2014-0107179

(51) Int. Cl.
| | |
|---|---|
| *G06F 3/01* | (2006.01) |
| *H04N 13/31* | (2018.01) |
| *H04N 13/366* | (2018.01) |
| *G02B 27/22* | (2018.01) |
| *G02B 27/00* | (2006.01) |

(52) U.S. Cl.
CPC ....... *H04N 13/366* (2018.05); *G02B 27/0093* (2013.01); *G02B 27/2214* (2013.01); *G06F 3/013* (2013.01); *H04N 13/31* (2018.05)

(58) Field of Classification Search
CPC .............. H04N 13/0468; G02B 27/0093
See application file for complete search history.

(56) References Cited

U.S. PATENT DOCUMENTS

| | | | | |
|---|---|---|---|---|
| 5,315,377 A | * | 5/1994 | Isono | G03B 35/24 345/419 |
| 8,784,206 B1 | * | 7/2014 | Gronkowski | G07F 17/3206 463/32 |
| 8,836,773 B2 | * | 9/2014 | Lin | H04N 13/341 348/56 |
| 9,091,876 B2 | * | 7/2015 | Kim | G02F 1/1335 |
| 9,164,286 B2 | * | 10/2015 | Odake | G02B 27/2214 |
| 9,389,415 B2 | * | 7/2016 | Fattal | G02B 26/0808 |

(Continued)

FOREIGN PATENT DOCUMENTS

| | | |
|---|---|---|
| CN | 102628998 A | 8/2012 |
| EP | 0 540 137 A1 | 5/1993 |

(Continued)

OTHER PUBLICATIONS

Kleinsorge, "From the Theory of Liquid Crystals to LCD-Displays," Dec. 7, 2004, XP055230919, 22 pages.

*Primary Examiner* — Jayanti K Patel
*Assistant Examiner* — Irfan Habib
(74) *Attorney, Agent, or Firm* — Birch, Stewart, Kolasch & Birch, LLP

(57) ABSTRACT

A display device discussed, and includes a display panel to display a left-eye image and a right-eye image; a parallax barrier panel to block and transmit the left-eye image and the right-eye image so that the left-eye image and the right-eye image reaching a user's left-eye and right-eye, respectively, produces a 3D image; a camera to sense a user's movement; and a controller to implement the 3D image by estimating a user's position when the user moves, and by applying a driving voltage to a barrier electrode according to the estimated position.

18 Claims, 9 Drawing Sheets

(56) References Cited

U.S. PATENT DOCUMENTS

| | | | |
|---|---|---|---|
| 9,495,589 B2* | 11/2016 | Strombom | A61B 3/113 |
| 9,716,877 B2* | 7/2017 | Kang | G02B 27/2214 |
| 2006/0012675 A1* | 1/2006 | Alpaslan | G06F 3/011 |
| | | | 348/51 |
| 2008/0218459 A1 | 9/2008 | Kim et al. | |
| 2011/0050867 A1* | 3/2011 | Hasegawa | G02B 27/0093 |
| | | | 348/55 |
| 2011/0267437 A1* | 11/2011 | Abeloe | H04N 13/398 |
| | | | 348/51 |
| 2012/0098744 A1* | 4/2012 | Stinson, III | G06F 3/0304 |
| | | | 345/158 |
| 2012/0154463 A1* | 6/2012 | Hur | G02B 27/2214 |
| | | | 345/691 |
| 2012/0162204 A1* | 6/2012 | Vesely | G06F 3/0325 |
| | | | 345/419 |
| 2012/0162214 A1* | 6/2012 | Chavez | G06F 3/012 |
| | | | 345/419 |
| 2012/0162384 A1* | 6/2012 | Vesely | G06T 19/006 |
| | | | 348/47 |
| 2013/0057539 A1* | 3/2013 | Kim | G02F 1/134309 |
| | | | 345/419 |
| 2013/0155208 A1* | 6/2013 | Ichihashi | G02F 1/13306 |
| | | | 348/54 |
| 2013/0169704 A1* | 7/2013 | Tanaka | G09G 3/3406 |
| | | | 345/691 |
| 2013/0176203 A1* | 7/2013 | Yun | G02B 27/2214 |
| | | | 345/156 |
| 2013/0234934 A1* | 9/2013 | Champion | G06F 3/012 |
| | | | 345/156 |
| 2013/0335537 A1* | 12/2013 | Goro | H04N 13/31 |
| | | | 348/54 |
| 2014/0184760 A1* | 7/2014 | Kato | G02B 27/22 |
| | | | 348/52 |
| 2014/0192172 A1 | 7/2014 | Kang et al. | |
| 2014/0247211 A1* | 9/2014 | Hayashi | G02B 27/2214 |
| | | | 345/156 |
| 2015/0042771 A1* | 2/2015 | Jensen | G06F 3/013 |
| | | | 348/54 |
| 2015/0219960 A1* | 8/2015 | Seo | G02B 27/2214 |
| | | | 349/96 |
| 2015/0341626 A1* | 11/2015 | Kim | H04N 21/42202 |
| | | | 348/51 |

FOREIGN PATENT DOCUMENTS

| | | |
|---|---|---|
| EP | 0 829 743 A2 | 3/1998 |
| EP | 2 418 862 A2 | 2/2012 |
| GB | 2317291 A | 3/1998 |
| GB | 2494214 A | 3/2013 |
| KR | 10-2013-0038658 A | 4/2013 |
| WO | WO 2013/173776 A1 | 11/2013 |

* cited by examiner

CAMERA SPEC EFFECT: 30FPS(33ms)

CAMERA SPEC EFFECT: 60FPS(16.6ms)

3D DISPLAY DEVICE FOR REDUCING MOVING FLICKER

CROSS-REFERENCE TO RELATED APPLICATION

Pursuant to 35 U.S.C. § 119(a), this application claims the benefit of earlier filing date and right of priority to Korean Application No. 10-2014-0107179, filed on Aug. 18, 2014, the contents of which is incorporated by reference herein in its entirety.

BACKGROUND OF THE INVENTION

1. Field of the Invention

Embodiments of the present invention relate to a 3D image display device, and more particularly, to a 3D image display device capable of minimizing a moving flicker by moving a barrier through estimation of a user's position.

2. Background of the Invention

Three-dimensional (3D) display may be succinctly defined as "all types of systems for artificially generating a 3D screen."

Here, a system may include software technologies generating images that can be seen or perceived as three-dimensional images, and hardware for actually implementing contents made by the software technologies. As described above, the system includes a software portion because contents configured with a particular software scheme are separately required for each stereoscopic implementation process in an instance of 3D display hardware.

Furthermore, virtual 3D display (hereinafter, referred to as a stereoscopic 3D display device) may be defined as all types of systems for allowing a user to virtually feel (or perceive) depth in the planar display hardware using binocular disparity due to eyes being separated from each other by about 65 mm in the horizontal direction among various factors for allowing the user (a person) to feel a three-dimensional effect. In other words, our eyes view slightly different images (strictly speaking, left and right spatial information being slightly divided) even when viewing the same object due to binocular disparity, and if those two images are transmitted to the brain through the retina, then the brain fuses the two images together in a correct manner to allow us to feel depth. Using this phenomenon, a stereoscopic 3D display device implements virtual depth through a design of displaying the left and right two images at the same time on a two-dimensional display device and sending them to each eye.

In order to display two channel images on a screen in the stereoscopic 3D display device, for example, each channel is outputted by changing each row in one direction (horizontal or vertical) on a screen. In this manner, when two channel images are outputted at the same time on a display device, the right image enters into the right eye and the left image enters into the left eye as they are in an instance of a glasses-free type from the viewpoint of hardware structure. Furthermore, in an instance of a glasses wearing type, used is a method of hiding the right image to be unseen by the left eye and hiding the left image to be unseen by the right eye, respectively, through specific glasses suitable to each type.

The most important factor for allowing a person to feel stereoscopic and depth effects may be binocular disparity due to a distance between the two eyes, but also closely related to psychological and memory factors, and therefore, 3D implementation methods are typically divided into a volumetric type, a holographic type and a stereoscopic type based on the level of three-dimensional image information provided to an observer.

The volumetric type as a method of feeling (or perceiving) a perspective in a depth direction due to a psychological factor and a suction (or immersion) effect may be applicable to 3D computer graphics in which perspective projection, overlapping, shadow, luminance, movement and the like are shown based on their calculations, and so-called IMAX cinemas in which a large-sized screen having a wide viewing angle is provided to an observer to evoke an optical illusion and create the feeling of being sucked (or immersed) into a space.

The holographic type known as the most complete 3D implementation technique may be represented by a laser beam reproduction holography or white light reproduction holography.

Furthermore, the stereoscopic type as a method of feeling (or perceiving) a stereoscopic effect using a binocular physiological factor uses the capacity of generating spatial information prior to and subsequent to a display plane during the process of allowing a brain to combine them to feel a stereoscopic feeling when associative images of a plane including parallax information are seen on human left and right eyes being separated from each other by about 65 mm as described above, namely, stereography. The stereoscopic type may be largely divided into a glasses-wearing type and a glasses-free type.

A representative method known as the glasses-free type may include a lenticular lens mode and a parallax barrier mode in which a lenticular lens sheet on which cylindrical lenses are vertically arranged is provided at a front side of the image panel.

Hereinafter, a general parallax barrier type 3D image display device will be explained in more detail with reference to the attached drawings.

FIG. 1 is a view illustrating a configuration of a parallax barrier type 3D image display device in accordance with a related art.

As shown in FIG. 1, the general parallax barrier type 3D image display device includes a display panel 40 for displaying both an image for a left-eye and an image for a right-eye, and a parallax barrier 20 disposed on a front surface of the display panel 40.

On the display panel 40, left-eye pixels (L) for displaying images for the left-eye, and right-eye pixels (R) for displaying images for the right-eye are alternately formed. Also, the parallax barrier 20 is disposed between the display panel 40 and a user 30.

Slits 22 are formed between barriers 21, so that images for the left-eye and images for the right-eye are separately displayed through the parallax barrier 20.

In the 3D display device, images for the left-eye displayed on the left-eye pixels (L) of the display panel 40 reach the left eye of the user 30, through the slits 22 of the parallax barrier 20. Also, images for the right-eye displayed on the right-eye pixels (R) of the display panel 40 reach the right eye of the user 30, through the slits 22 of the parallax barrier 20. In this instance, separate images with consideration of a disparity perceptible by a human are included in the images for the right and left images, and the user 30 can view a 3D image by combining the two images with each other.

However, the parallax barrier type 3D display device has the following problems.

Firstly, when a user deviates from a specific position, part of an image is blocked by the barrier. As a result, a 3D image is not implemented. Further, when a user moves on a set position, the user cannot view a 3D image, since he or she is out of a right and left viewing angle (about 5° right and left).

SUMMARY OF THE INVENTION

Therefore, an aspect of the detailed description is to provide a 3D display device capable of preventing occurrence of a moving flicker due to a brightness deviation, by driving barriers by estimating a future position of a user who is moving.

To achieve these and other advantages and in accordance with the purpose of this specification, as embodied and broadly described herein, there is provided a display device, including: a display panel configured to display a left-eye image and a right-eye image; a parallax barrier panel configured to make the left-eye image and the right-eye image reach a user's left-eye and right-eye, respectively, by blocking and transmitting the left-eye image and the right-eye image; a camera configured to sense a user's movement; and a controller configured to implement a 3D image by estimating a user's position when the user moves, and by applying a driving voltage to a barrier electrode according to the estimated position.

The parallax barrier panel may include: first and second substrates each including a blocking region and a transmitting region; a liquid crystal layer formed between the first and second substrates; a barrier electrode formed at the blocking region and the transmitting region of the first substrate; a common electrode formed at the second substrate, and configured to apply an electric field to the liquid crystal layer together with the barrier electrode; first and second alignment layers formed at the first and second substrates, respectively, and each alignment layer having an alignment direction; and a polarizing plate disposed on an upper surface of the second substrate, and having an optical axis of which direction is parallel to the alignment direction of the first alignment layer and the second alignment layer, thereby one of the left-eye image and the right-eye image are transmitted through one of the blocking region and the transmitting region where the electric field is not formed.

The controller may include: a position sensor configured to sense a past position and a current position of the user, based on information input from the camera; a position estimator configured to estimate a future position of the user, based on information sensed by the position sensor; and an electrode driver configured to move the blocking region and the transmitting region by applying a voltage to the barrier electrode.

The embodiments of the present invention can have the following advantages.

Firstly, in the embodiments of the present invention, a 3D image can be implemented as a left-eye image and a right-eye image incident from the display panel are selectively transmitted or blocked as an electric field is applied to the liquid crystal layer. Also, a 2D image can be implemented as an incident image is entirely transmitted. Thus, a single display device may serve as a dual display device for a 2D image and a 3D image.

Further, even when a user moves at a rapid speed, barriers can be driven at an optimum time point as a future position of the user is estimated. This can minimize a brightness deviation, and thus, can minimize a moving flicker.

Further scope of applicability of the embodiments of the present application will become more apparent from the detailed description given hereinafter. However, it should be understood that the detailed description and specific examples, while indicating example embodiments of the present invention, are given by way of illustration only, since various changes and modifications within the spirit and scope of the present invention will become apparent to those skilled in the art from the detailed description.

BRIEF DESCRIPTION OF THE DRAWINGS

The accompanying drawings, which are included to provide a further understanding of the present invention and are incorporated in and constitute a part of this specification, illustrate example embodiments and together with the description serve to explain the principles of the present invention.

In the drawings.

DETAILED DESCRIPTION OF THE EMBODIMENTS

Description will now be given in detail of example configurations of a 3D image display device for reducing a moving flicker according to the embodiments of the present invention, with reference to the accompanying drawings.

The embodiments of the present invention provide a display device which can view both a 2D image and a 3D image. The embodiments of the present invention relate to a parallax barrier-type 3D display device for using a 2D image and a 3D image in a converting manner, by adopting a parallax barrier panel using liquid crystals, not a parallax barrier formed of mechanical barriers and slits.

Further, in the embodiments of the present invention, since a blocking region and a transmitting region of a parallax barrier panel are moved according to a user's movement, a range of a right and left viewing angle can be more enhanced, and a 3D image can be provided to a user who moves in real time.

Further, in the embodiments of the present invention, even if a user moves at a speed faster than a frame per second (FPS) of a camera, a future position of the user is estimated for prevention of a moving flicker. Then, the blocking region and the transmitting region of the parallax barrier panel are moved in correspondence to the user's future position.

Figure 2A:
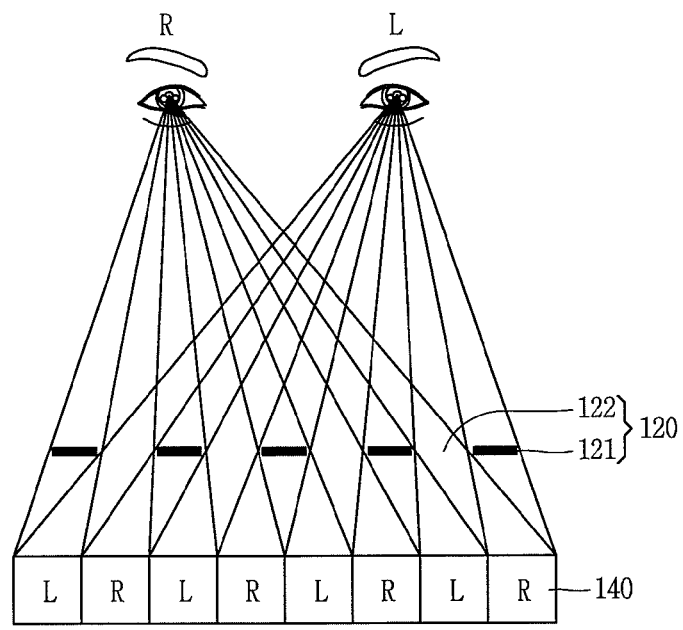
FIGS. 2A to 2C are views illustrating a movement of a parallax barrier when a user moves.
Figure 2B:
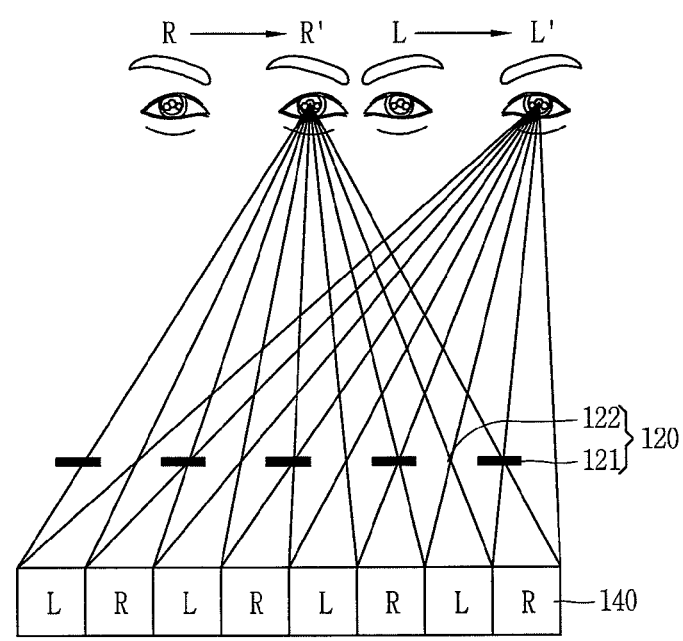
Figure 2C:
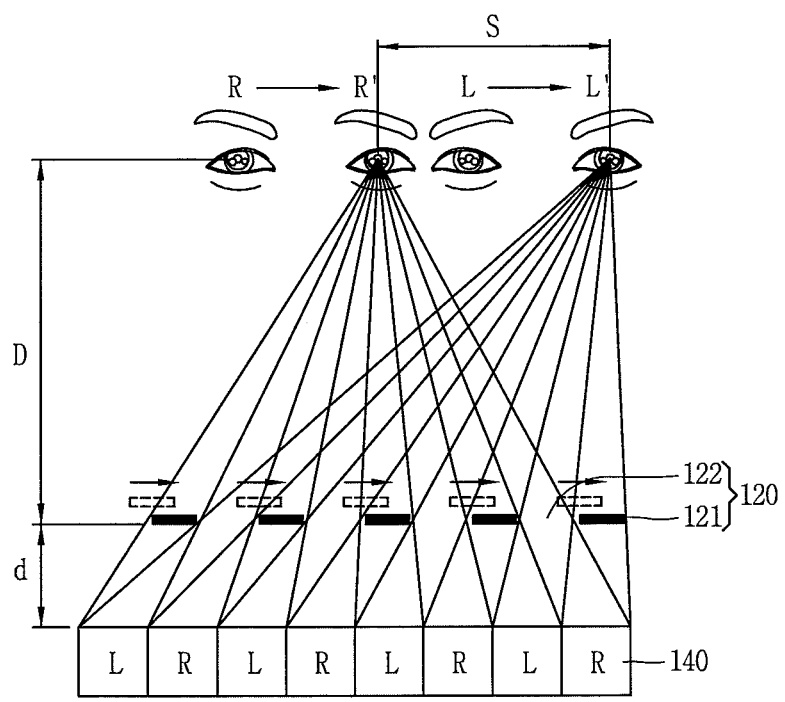

FIGS. 2A to 2C are views illustrating a driving or movement of barriers according to a user's movement in a general parallax barrier, which explain that a 3D image is always implemented as the parallax barrier is moved according to a user's movement.

As shown in FIG. 2A, once a user is located at a position (R,L) within a right and left viewing angle range where a 3D display device can be viewed (about 5° right and left), left-eye images are output to left-eye pixels (L) of a display panel 140, and right-eye images are output to right-eye pixels (R) of the display panel 140. The output images reach a parallax barrier 120.

In this instance, images which proceed to the right eye, among the left-eye images output from the left-eye pixels (L) are blocked by barriers of the parallax barrier 120, and only images which proceed to the left eye are transmitted through slits 122 to thus reach the left eye. Likewise, images which proceed to the left eye, among the right-eye images output from the right-eye pixels (R) are blocked by the barriers of the parallax barrier 120, and only images which proceed to the right eye are transmitted through the slits 122 to thus reach the right eye. As the images which have reached the left eye and the right eye are combined with each other, a user can feel a stereoscopic effect.

As shown in FIG. 2B, if the user moves to R',L' from R,L to be out of the right and left viewing angle range, an incidence angle from the user's left-eye pixels (L) and right-eye pixels (R) to the user's left eye and right eye is changed. Thus, left-eye images output from the left-eye pixels (L) so as to reach the left eye are partially blocked by the barriers, so they partially reach the right eye. Likewise, right-eye images output from the right-eye pixels (R) so as to reach the right eye are partially blocked by the barriers, so they partially reach the left eye. As part of the right-eye images reaches the left eye and part of the left-eye images reaches the right eye, quality of a 3D image is deteriorated, or a 3D image is not implemented.

In an embodiment of the present invention, when a user moves to R',L' from R,L, the barriers 121 of the parallax barrier 120 are moved by a predetermined distance as shown in FIG. 2C, thereby implementing a 3D image. Referring to FIG. 2C, the dotted lines indicate a position of the barriers 121 when the user is located at R,L, and the solid lines indicate a position of the barriers 121 when the user is located at R',L'. When the user moves to the right side from R,L the barriers 121 are also moved to the right side by a distance corresponding to a movement distance of the user. As a result, left-eye images are made to reach only the left eye, and right-eye images are made to reach only the left eye.

In this instance, the movement distance of the barriers 121 according to the user's movement is determined based on a distance (D) between the parallax barrier 120 and the user, and a distance (d) between the parallax barrier 120 and the display panel 140.

In the embodiment of the present invention, when a user moves, the barriers 121 of the parallax barrier 120 are also moved so that left-eye images may reach only the left eye and right-eye images may reach only the left eye. As a result, a 3D image is implemented.

Further, in the embodiment of the present invention, not only when a user has moved to a specific region, but also when a user moves real time, the parallax barrier 120 is moved real time. As a result, the moving user may always appreciate or perceive a 3D image.

Although FIG. 2C depicts the dotted lined positions of the barriers 121 and the solid lined positions of the barriers 121 as having a vertical offset, such is not necessarily indicative of an actual vertical offset, but simply to show more clearly the movement of the barriers 121.

Figure 3:
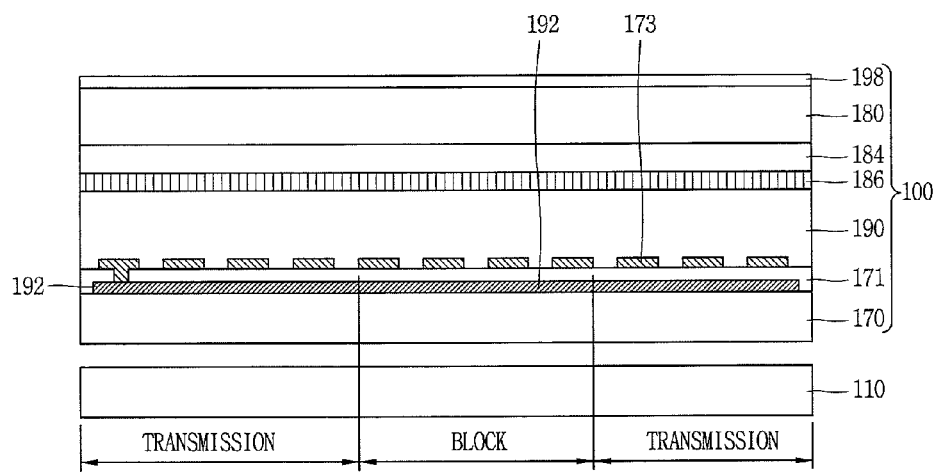
FIG. 3 is a view illustrating a structure of a display device according to an embodiment of the present invention.

FIG. 3 is a view illustrating a structure of a 3D display device according to an embodiment of the present invention.

As shown in FIG. 3, the 3D display device according to the embodiment of the present invention largely includes a display panel 110 (or a liquid crystal panel 110), and a parallax barrier panel 100 disposed on a front surface of the display panel 110, and configured to convert a 2D image and a 3D image to each other by selectively blocking and transmitting left-eye images and right-eye images output from the display panel 110.

The display panel 110 is formed so that the left-eye pixels for displaying left-eye image information and right-eye pixels for displaying right-eye image information are alternate with each other. The display panel 110, a flat display panel includes various types of display panels such as a liquid crystal panel, an organic light emitting display panel, and an electrophoretic display panel, for example.

The parallax barrier panel 100 includes a first substrate 170, a second substrate 180, and a liquid crystal layer 190 interposed between the first substrate 170 and the second substrate 180.

An insulating layer 171 is formed on the first substrate 170, and a plurality of barrier electrodes 173 are formed on the insulating layer 171. In the drawing, the insulating layer 171 is formed as a single layer. However, the insulating layer 171 may be formed as a plurality of layers. In this instance, the insulating layer 171 may be formed of an inorganic insulating material or an organic insulating material. Alternatively, the insulating layer 171 may be formed of an inorganic insulating layer/organic insulating layer, or an inorganic insulating layer/inorganic insulating layer.

The barrier electrodes 173 are formed of a transparent conductive material such as indium tin oxide (ITO) or indium zinc oxide (IZO). A first electrode of the barrier electrodes 173 and a second electrode of the barrier electrode 173 are formed with a predetermine gap therebetween.

In the drawings, the barrier electrodes 173 are formed on the insulating layer 171. However, the insulating layer 171 may be formed as a plurality of layers, and the barrier electrodes 173 may be formed on different layers.

A driving electrode 192 is formed on the first substrate 170. The driving electrode 192, configured to apply a voltage to the barrier electrodes 173, is electrically connected to the barrier electrodes 173 through contact holes formed on the insulating layer 171. In the drawings, the driving electrode 192 is formed on the first substrate 170. However, the driving electrode 192 may be formed on the insulating layer. The driving electrode 192 may be formed of a metallic material having high conductivity, such as Al or Al alloy, or may be formed of a transparent conductive material such as ITO or IZO.

A planarization layer 184 is entirely formed on the inside of the second substrate 180, i.e., a facing surface of the second substrate 180 to the first substrate 170. Also, a common electrode 186 is formed on the planarization layer 184. The common electrode 186 is entirely formed on the second substrate 180, with a transparent conductive material such as ITO or IZO. A black matrix for blocking a region between the barrier electrodes 173 may be formed on the second substrate 180.

The first substrate 170 and the second substrate 180 maintain a predetermined gap therebetween by a spacer, and the liquid crystal layer 190 is formed between the first substrate 170 and the second substrate 180. A sealant is applied to an outer peripheral region of the first substrate 170 and the second substrate 180, thereby attaching the first substrate 170 and the second substrate 180 to each other, and sealing the liquid crystal layer 190.

A common voltage is applied to the common electrode 186, and a driving voltage is applied to the barrier electrodes 173. Also, an electric field is applied to the liquid crystal layer 190 by a potential difference between the common electrode 186 and the barrier electrodes 173, and liquid crystal molecules 192 of the liquid crystal layer 190 are aligned along the electric field.

A first alignment layer and a second alignment layer, which are align-processed by rubbing, etc., are formed at the first substrate 170 and the second substrate 180, respectively. Also, the liquid crystal molecules 192 of the liquid crystal layer 190 are aligned along the alignment directions of the first alignment layer and the second alignment layer. The alignment directions of the first alignment layer and the second alignment layer may be perpendicular to each other, so that the liquid crystal molecules of the liquid crystal layer 190 may be aligned in a twisted manner by 90° from the first substrate 170 to the second substrate 180. Alternatively, the alignment directions of the first alignment layer and the second alignment layer may be parallel to each other, so that the liquid crystal molecules may be entirely formed on the liquid crystal layer 190 in the same direction.

A polarizing plate 198 is attached to an outer side surface of the second substrate 180. The polarizing plate 198 implements a 3D image by blocking and transmitting light incident by passing through the liquid crystal layer 190. A direction of an optical axis of the polarizing plate 198 is variable according to an alignment direction of the first alignment layer and the second alignment layer. However, in the embodiment of the present invention, the direction of the optical axis of the polarizing plate 198 is parallel to the alignment direction of the first alignment layer and the second alignment layer. Thus, the direction of the optical axis of the polarizing plate 198 is parallel to an alignment direction of the liquid crystal molecules 192.

In the above 3D display device, the parallax barrier panel 100 serves as the parallax barrier 120 shown in FIG. 2C. This will be explained in more detail.

As shown in FIG. 3, an electric field is formed between the barrier electrodes 173 formed on the first substrate 170, and the common electrode 186 formed on the second substrate 180. The electric field is applied to the liquid crystal layer 190.

The barrier electrodes 173 are formed to have a micro pattern, and the plurality of barrier electrodes 173 form a blocking region corresponding to the barriers of the parallax barrier and a transmitting region corresponding to the slits 122 shown in FIG. 2C. In the embodiment of the present invention, four barrier electrodes 173 form each of a transmitting region and a blocking region. However, more than or less than the four barrier electrodes 173 may form each of a transmitting region and a blocking region.

An electric field is formed by a relative potential difference between the common electrode 186 and the barrier electrodes 173. That is, in an instance where a common voltage is applied to the common electrode 186, if the same voltage as the common voltage of the common electrode 186 is applied to the barrier electrodes 173, an electric field is not formed. On the contrary, if a voltage having a different size or value from the common voltage of the common electrode 186 (a larger or smaller voltage, hereinafter will be called a 'driving voltage') is applied to the barrier electrodes 173, an electric field is formed. In this instance, the common voltage may be 0V, or more than or less than the 0V (±V).

Left-eye images and right-eye images generated from the display panel 110 are incident onto the parallax barrier panel 100 disposed on a front surface of the display panel 110. If the same voltage as the common voltage is applied to all of the barrier electrodes 173, no electric field is formed on an entire region of the liquid crystal layer 190. Thus, the liquid crystal molecules 192 of the liquid crystal layer 190 are aligned along the alignment directions of the first and second alignment layers.

Thus, among images incident from the display panel 110, only images having the same optical axis direction as the alignment direction of the liquid crystal molecules 192 pass through the liquid crystal layer 190. Since the optical axis direction of the polarizing plate 198 is parallel to the alignment direction of the liquid crystal molecules 192, optical components of left-eye images and right-eye images which pass through the liquid crystal layer 190 pass through the polarizing plate 198, thereby reaching a user's eyes. The user can recognize a 2D image as both of the left-eye component and the right-eye component reach the user's two eyes.

If a driving voltage is applied to the barrier electrodes 173 disposed at a blocking region and if the same voltage as the common voltage is applied to the barrier electrodes 173 disposed at a transmitting region, an electric field is applied to the liquid crystal layer 190 of the blocking region whereas an electric field is not applied to the liquid crystal layer 190 of the transmitting region. As a result, liquid crystal molecules of the liquid crystal layer 190 of the transmitting region are aligned along the alignment direction of the alignment layer. Also, liquid crystal molecules of the liquid crystal layer 190 of the blocking region are aligned to be perpendicular to a surface of the first substrate 170, along a vertical electric field formed to be perpendicular to the surface of the first substrate 170.

Once left-eye images and right-eye images are output from the display panel 110, an optical component parallel to the alignment direction of the alignment layer, among left-eye images and right-eye images incident onto the transmitting regions, reaches the polarizing plate 198 by passing through the liquid crystal layer 192. In this instance, since the optical component of the left-eye images and the right-eye images is parallel to the optical axis direction of the polarizing plate 198, the optical component reaches the user's left eye or right eye, by passing through the polarizing plate 198.

Once left-eye images and right-eye images are incident onto the blocking regions from the display panel 110, an optical component parallel to a vertical electric field, among the left-eye images and the right-eye images, passes through the liquid crystal layer 192, thereby reaching the polarizing plate 198. However, since the optical component of the left-eye images and the right-eye images which pass through the liquid crystal layer 190 is not parallel to the optical axis component of the polarizing plate 198, the optical component of the left-eye images and the right-eye images are blocked by the polarizing plate 198. As a result, the optical component of the left-eye images and the right-eye images does not reach a user's eyes.

In the parallax barrier panel 100 of the embodiment of the present invention, as a driving voltage is applied to the barrier electrodes 173 of blocking regions, transmission of an image is prevented. Further, as the same voltage as the common voltage is applied to the barrier electrodes 173 of the transmitting regions, transmission of an image is executed or performed. As left-eye images and right-eye images are selectively transmitted to the transmitting regions, a 3D image may be implemented.

Figure 1:
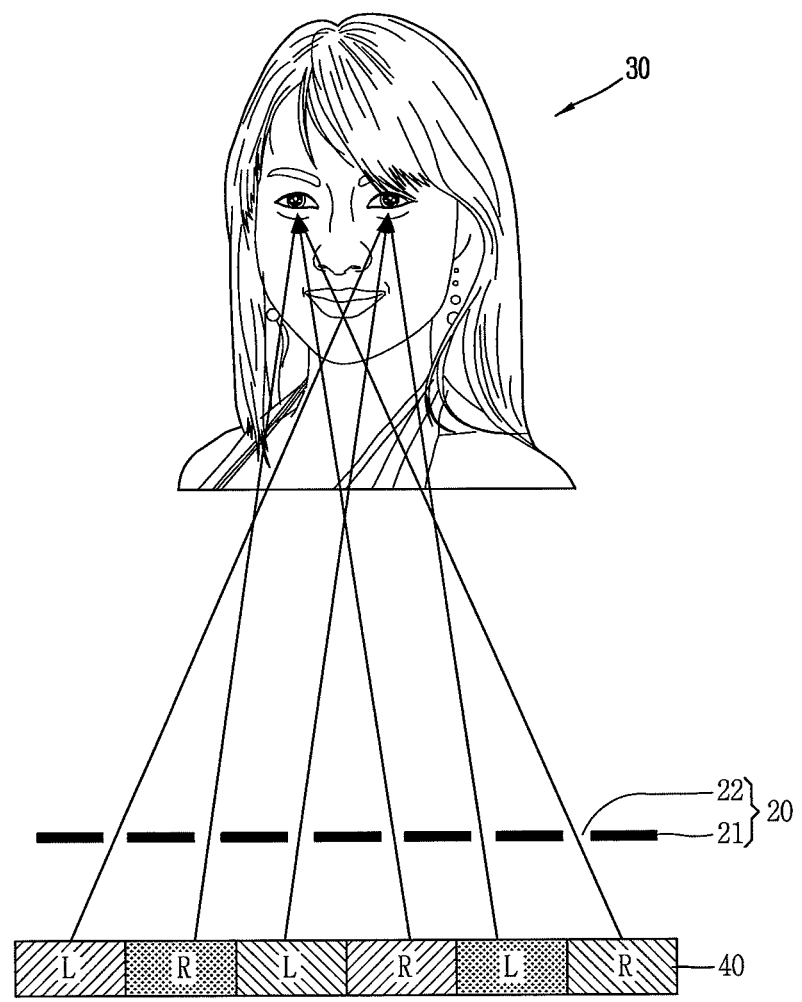
FIG. 1 is a view illustrating a 3D implementation method using a general parallax barrier.

The blocking regions of the parallax barrier panel 100 shown in FIG. 3 correspond to the barriers of the general parallax barrier shown in FIG. 1, and the transmitting regions of the parallax barrier panel 100 correspond to the slits of the general parallax barrier. Thus, left-eye images output from the display panel 110 pass through the transmitting regions to thus reach a user's left eye, and right-eye images output from the display panel 110 are blocked by the blocking regions not to reach the user's left eye. Likewise, right-eye images output from the display panel 110 pass through the transmitting regions to thus reach a user's right eye, and left-eye images output from the display panel 110 are blocked by the blocking regions not to reach the user's right eye. The user may recognize a 3D image by combining the left-eye images and the right-eye images with each other.

In the embodiment of the present invention, a 2D image is implemented as the same voltage as the common voltage is applied to all the barrier electrodes 173, and a 3D image is implemented as a driving voltage is applied to the barrier electrodes 173 of the blocking regions and the common voltage is applied to the barrier electrodes 173 of the transmitting regions. Thus, a single display device may serve as a dual display device for a 2D image and a 3D image.

The blocking regions and the transmitting regions are variable. That is, as a user moves, the blocking regions and the transmitting regions are also moved so that a user may always appreciate or perceive a 3D image. In the embodiment of the present invention, the blocking regions indicate regions where an image is not transmitted, since liquid crystal molecules are aligned by an electric field as a driving voltage is applied to the barrier electrodes 173. On the contrary, the barrier electrodes 173 indicate regions where an image is transmitted as a driving voltage is not applied to the barrier electrodes 173. That is, the transmitting regions and the blocking regions are defined according to whether a driving voltage is applied to the barrier electrodes 173 or not. Thus, the transmitting regions and the blocking regions may be changed as the barrier electrodes 173 to which a driving voltage is applied is changed.

In the embodiment of the present invention, since four (4) barrier electrodes 173 are formed in each of one transmitting region and one blocking region, the parallax barrier has a barrier pitch of eight (8) barrier electrodes 173. However, the embodiments of the present invention are not limited to this. That is, the barrier pitch may be composed of various number of barrier electrodes 173.

When a user moves, the blocking regions and the transmitting regions are also moved. That is, since a part of the barrier electrodes 173, to which a driving voltage is applied, is moved, the blocking regions and the transmitting regions are also moved.

Figure 4:
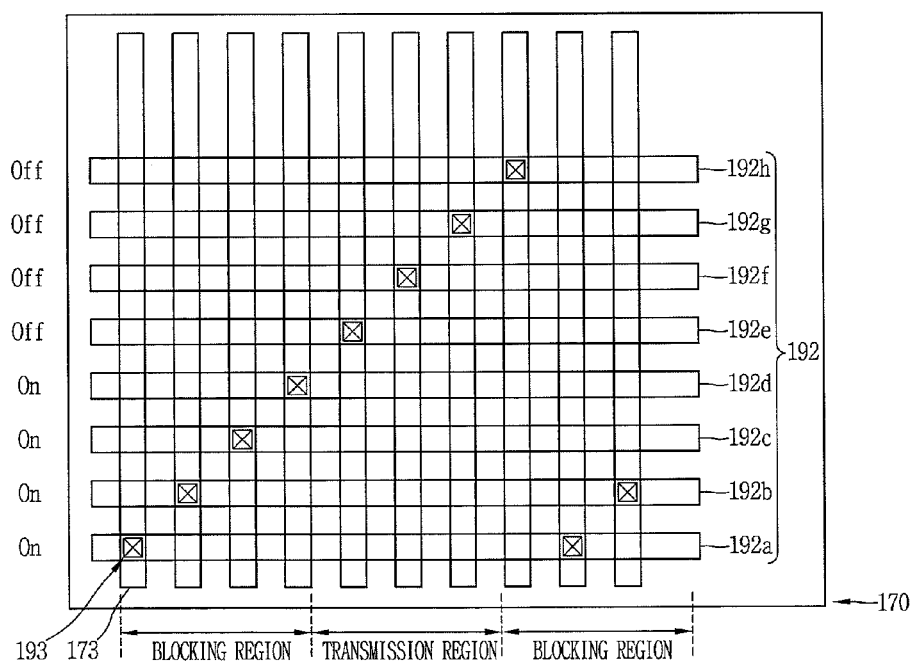
FIG. 4 is a view illustrating an electrode structure of a display device according to an embodiment of the present invention.

FIG. 4 is a view illustrating an electrode structure of the parallax barrier panel 100 according to an embodiment of the present invention.

Hereinafter, a method for applying a driving voltage to the barrier electrodes 173 will be explained with reference to FIG. 4.

As shown in FIG. 4, the driving voltage 192 is disposed below the barrier electrodes 173 in a state where an insulating layer is interposed therebetween, and is electrically connected to the barrier electrodes 173 through contact holes 193. In the embodiment of the present invention, since four barrier electrodes 173 form one transmitting region and one blocking region, respectively, for example, the transmission region and the blocking region are implemented by applying a driving voltage to the four barrier electrodes 173 at a time, and by applying the same voltage as the common voltage to the four barrier electrodes 173. Thus, in order to implement a 3D image by applying a voltage to the barrier electrodes 173, eight driving electrodes 192a-192h connected to eight barrier electrodes 173 are required.

If the number of the barrier electrodes 173 of the barrier pitch is less than or more than eight, the number of the driving voltages 192 is also less than or more than eight. That is the number of the barrier electrodes 173 is the same as that of the driving electrodes 192.

Referring to FIG. 4, 1st~4th driving electrodes 192a-192d are electrically connected to 4 barrier electrodes 173 of a first group from the left, and 5th~8th driving electrodes 192e-192h are electrically connected to 4 barrier electrodes 173 of a second group. From one side of the parallax barrier panel 100, 4 barrier electrodes are connected to the 1st~4th driving electrodes 192a-192d, the next 4 barrier electrodes are connected to the 5th~8th driving electrodes 192e-192h, and the next 4 barrier electrodes are connected to the 1st~4th driving electrodes 192a-192d. As such an electrical connection is repeated on an entire region of the parallax barrier panel 100, all the barrier electrodes 173 formed on the parallax barrier panel 100 are electrically connected to the 8 driving electrodes 192.

In this instance, since the driving voltage is applied to the 1st~4th driving electrodes 192a-192d and the same voltage as the common voltage is applied to the 5th~8th driving electrodes 192e-192h, the 1st~4th driving electrodes 192a-192d are turned on (i.e., form an electric field with the common electrode), and the 5th~8th driving electrodes 192e-192h are turned off (i.e., do not form an electric field). Thus, in the electrode structure shown in FIG. 4, the 1st~4th driving electrodes 192a-192d serve as blocking regions and the 5th~8th driving electrodes 192e-192h serve as transmitting regions.

If a user moves, a voltage application region of the driving electrodes 192 is changed. For instance, in the structure shown in FIG. 4, if a user moves to the right, a common voltage rather than a driving voltage is applied to a first driving electrode 192a, and a driving voltage rather than a common voltage is applied to a fifth driving electrode 192e. As a result, the first barrier electrode 173 from the left is converted to an 'off' state from an 'on' state, and the fifth barrier electrode 173 from the left is converted to an 'on' state from an 'off' state.

Figure 5:
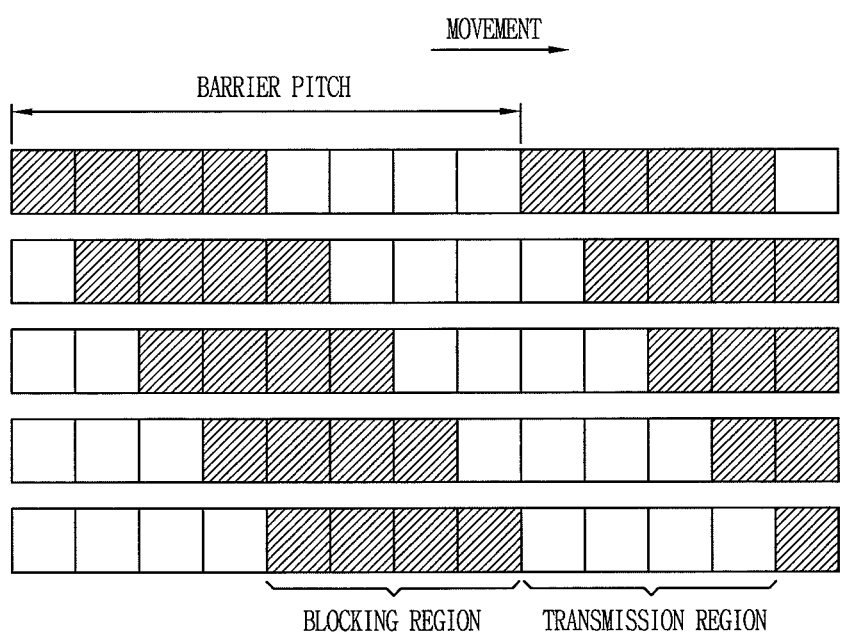
FIG. 5 is a view illustrating an electrode driving operation when a user moves.

As a result, the blocking regions and the transmitting regions are moved to the right by a pitch of the barrier electrodes 173, respectively. Such a driving is repeated as the user repeatedly moves, and thus, the blocking regions and the transmitting regions are moved along the user's movement as shown in FIG. 5, thereby implementing a 3D image. Referring to FIG. 5, regions indicated by deviant crease lines indicate blocking regions (hatched regions), and the remaining regions indicate transmitting regions (blank regions). The blocking regions and the transmitting regions are moved to the right, as a driving voltage application region of the barrier electrode 173 is changed when the user moves.

The structure of the barrier electrodes 173 and the driving electrodes 192 is not limited to the specific structure shown in FIG. 4. Referring to FIG. 4, the barrier electrodes 173 and the driving electrodes 192 are connected to each other via contact holes. But the barrier electrodes 173 may be directly connected to the driving electrodes 192 via no contact holes. That is, in the embodiment of the present invention, the driving electrodes 192 for applying a driving voltage to the barrier electrodes 173 may be formed in various manners.

As aforementioned, a driving voltage application region of the barrier electrodes 173 is changed according to a user's movement. The user's movement is detected through an eye tracking system for detecting a user's eyes.

The eye tracking system firstly captures a user's eyes using a camera, and then detects a position of the user. However, the eye tracking system has the following problems. Generally, the eye tracking system adopts a camera of 30 FPS (Frame Per Second). Accordingly, if a user moves at a faster speed than the 30 FPS, the eye tracking system cannot precisely detect the user's movement. As a result, the parallax barrier is converted with delay. This may increase a brightness deviation due to conversion of the barriers, and thus, increase a moving flicker.

In the embodiments of the invention, the use of a camera having 30 FPS is discussed. It is noted that use of a 30 FPS camera is not a requirement, and cameras having speeds other than 30 FPS, or other optical devices, image captures device, and sensors may also be used.

Figure 6A:
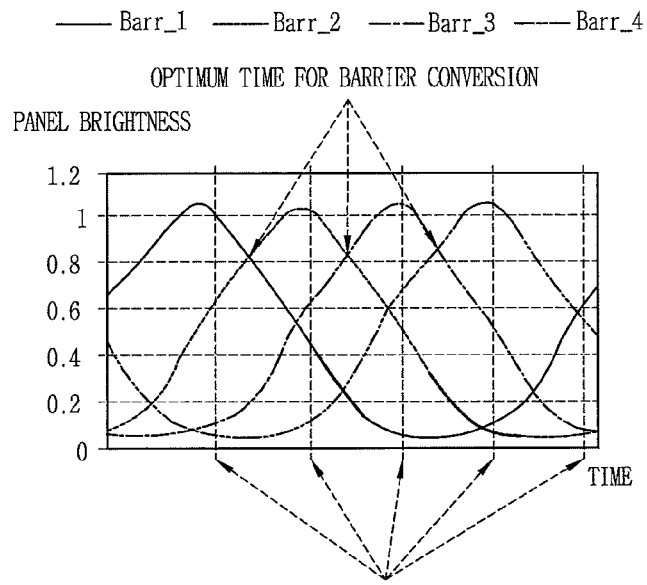
FIG. 6A is a graph illustrating brightness of an image through each barrier in a parallax barrier type-3D display device.
Figure 6B:
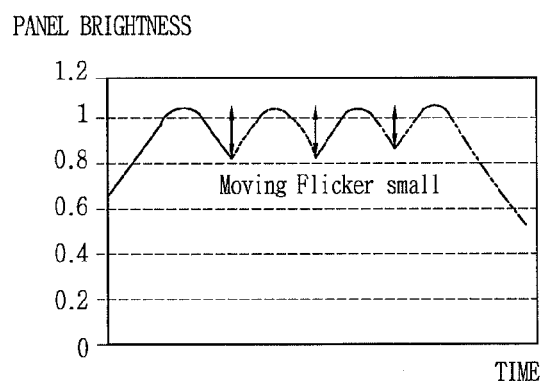
FIG. 6B is a graph illustrating brightness of an image when a barrier conversion is executed at an optimum time point.
Figure 6C:
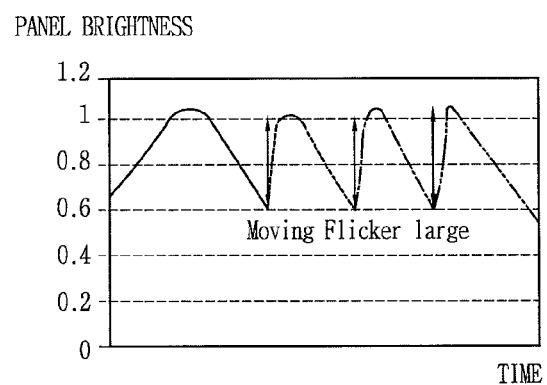
FIG. 6C is a graph illustrating brightness of an image when a barrier conversion is executed with delay.

FIG. 6A is a graph illustrating brightness of an image through each barrier when a user moves, FIG. 6B is a graph illustrating brightness of an image when a barrier conversion is executed at an optimum time point, and FIG. 6C is a graph illustrating brightness of an image when a barrier conversion is executed with delay.

As shown in FIG. 6A, each of 4 barriers has a brightness curve indicated as a quadratic function curve. An interval between maximum values of the brightness curves is the same as a interval between the barriers. When a user moves, an optimum barrier conversion time is a moment when the first barrier moves to the second barrier. Thus, the optimum barrier conversion time is a time point when the brightness curves of the barriers shown in FIG. 6A meet with each other.

As shown in FIG. 6B, at the optimum barrier conversion time, the brightness has a maximum value of about 1.05 and a minimum value of about 0.82. In this instance, a brightness deviation is about 0.23.

If the barrier conversion time is delayed as the user moves at a fast speed, the brightness curves of the $2^{nd}$ and $4^{th}$ barriers are moved to the right. In this instance, the barrier conversion time corresponds to a point where the brightness curves which have moved to the right meet each other.

In the instance where the barrier conversion time has been converted, the brightness curves are shown in FIG. 6C. Referring to the graph shown in FIG. 6C, the brightness has a maximum value of about 1.05 and a minimum value of about 0.6. In this instance, a brightness deviation is about 0.45.

That is, in the instance where the barrier conversion time has been delayed, since the brightness deviation is about 0.45, the brightness deviation is increased about two times compared to that at the optimum barrier conversion time. If the barrier conversion time is delayed due to a user's rapid movement, brightness of an image is increased. This may increase a moving flicker, thereby deteriorating a picture quality of a 3D image.

In order to prevent delay of the barrier conversion time due to a user's rapid movement, a high performance camera having a higher shutter speed than 30 FPS is used to drive barriers at an optimum conversion time according to a user's movement. However, fabrication costs increase due to a high price of the high performance camera. Moreover, since there is a limitation in an FPS of a camera, when a user moves at a high speed, it is substantially impossible to drive the barriers without any delay, by detecting a movement of the user at a proper time.

In the embodiment of the present invention, when a user moves at a high speed, the barriers are driven without delay by a general camera of 30 FPS, thereby preventing occurrence of a moving flicker. In the embodiment of the present invention, when a user moves at a high speed, the barriers are driven through estimation of the user's movement. This can allow the barriers to be driven without delay, even by a camera of a low FPS.

Figure 7A:
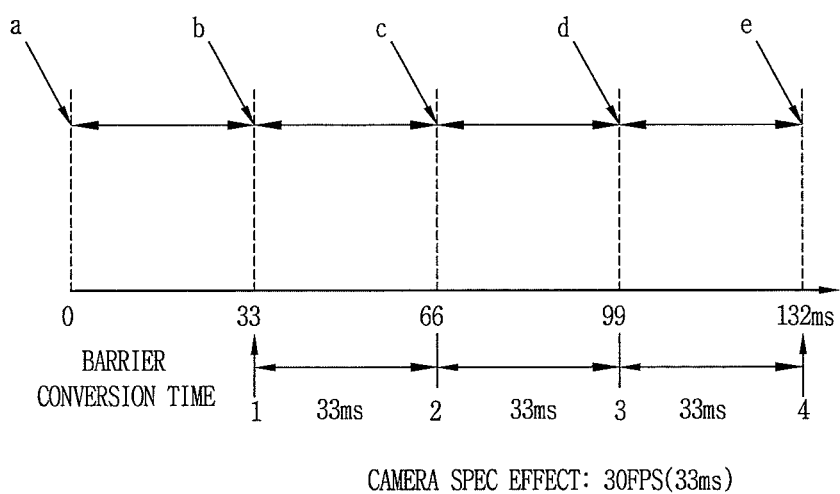
FIG. 7A is a view conceptually illustrating an example barrier conversion time when a barrier delay occurs in an instance where a camera of 30 FPS is used.
Figure 7B:
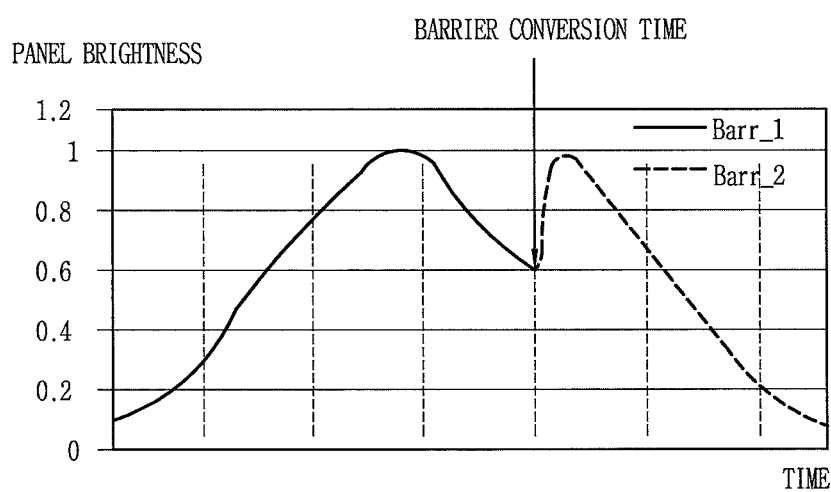
FIG. 7B is a view illustrating brightness of an image when a barrier delay occurs in an instance where a camera of 30 FPS is used.
Figure 8A:
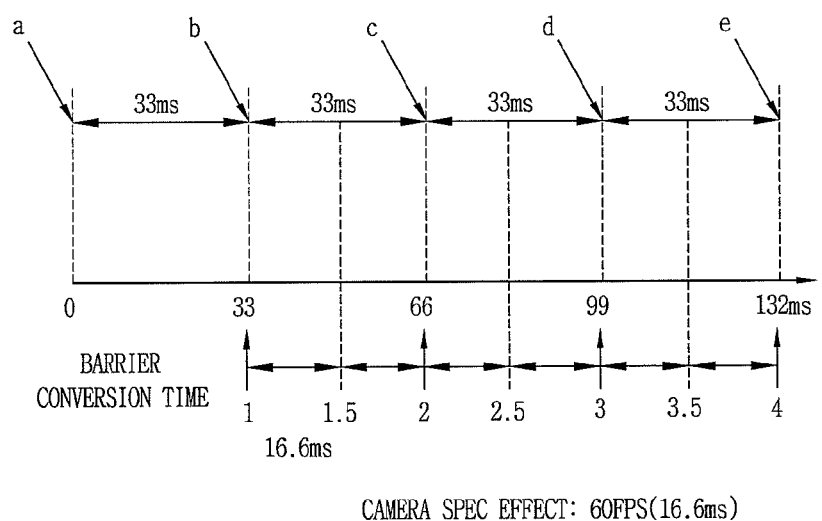
FIG. 8A is a view conceptually illustrating a barrier conversion time when a position estimation operation is executed according to an embodiment of the present invention.
Figure 8B:
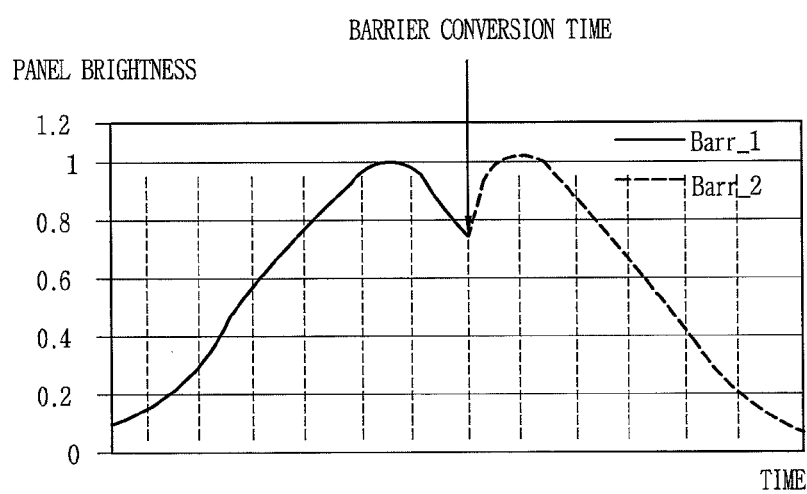
FIG. 8B is a view illustrating brightness of an image when a position estimation operation is executed according to an embodiment of the present invention.

FIGS. 7A and 7B relate to an occurrence of barrier delay when a camera of 30 FPS is used, and FIGS. 8A and 8B relate to a position estimation using a camera of 30 FPS. More specifically, FIGS. 7A and 8A conceptually illustrate barrier conversion times, and FIGS. 7B and 8B illustrate brightnesses of images.

As shown in FIG. 7A, if a user moves to a position 'e' from a position 'a', a first barrier conversion time (1) corresponds to a point where a time (33 ms) has lapsed from the position 'a', since the camera of 30 FPS is used. Likewise, a second barrier conversion time (2) corresponds to a point where 33 ms has lapsed from the first barrier conversion time (1), a third barrier conversion time (3) corresponds to a point where 33 ms has lapsed from the second barrier conversion time (2), and a fourth barrier conversion time (4) corresponds to a point where 33 ms has lapsed from the third barrier conversion time (3).

If the barriers are driven with delay because a user's moving speed is faster than the FPS of the camera, the brightness graph of the first barrier meets the brightness graph of the second barrier which has shifted to the right. In this instance, the point where the two brightness graphs meet corresponds to a barrier conversion time, resulting in a high brightness deviation.

As shown in FIG. 8A, when a user moves to a position 'e' from a position 'a', a future position of the user is estimated through a position estimation, even if the camera of 30 FPS is used. Thus, the first barrier conversion time (1) corresponds to a point where a predetermined time (16.6 ms) has lapsed from the position 'a'. Likewise, the next barrier conversion time (1.5) corresponds to a point where 16.6 ms has lapsed from the first barrier conversion time (1), and the second barrier conversion time (2) corresponds to a point where 16.6 ms has lapsed from the barrier conversion time (1.5). The next barrier conversion time (2.5) corresponds to a point where 16.6 ms has lapsed from the second barrier conversion time (2), and the third barrier conversion time (3) corresponds to a point where 16.6 ms has lapsed from the barrier conversion time (2.5). The next barrier conversion time (3.5) corresponds to a point where 16.6 ms has lapsed from the third barrier conversion time (3), and the fourth barrier conversion time (4) corresponds to a point where 16.6 ms has lapsed from the barrier conversion time (3.5).

The barrier conversion times (1.5→2→2.5→3→3.5→4) mean that barrier conversions have been executed at intermediate times of 1→2→3→4 once more. If a position estimation is executed within a shorter time, barrier conversions may be executed at intermediate times of 1→2→3→4 twice more.

Thus, even if a user's moving speed is faster than the FPS of the camera, the barriers are driven as a position of the user is estimated through a position estimation. As a result, the barriers are driven without any delay.

That is, as shown in FIG. 8B, in the embodiment of the present invention, since the number of barrier driving times or speed is increased two times or more compared to that of a general instance, the driving of the barriers is not delayed, and thereby a brightness deviation is minimized.

In the above descriptions, the user's position estimation is executed at time intervals of 16.6 ms. But if the user's position estimation is executed at shorter time intervals, barrier driving is executed faster by three times or more when barrier driving is executed once in a general parallax barrier structure. This can allow barrier conversion times to be controlled more precisely.

The parallax barrier panel 100 is driven by a controller, based on the above user's position estimation and an estimated position.

Figure 9:
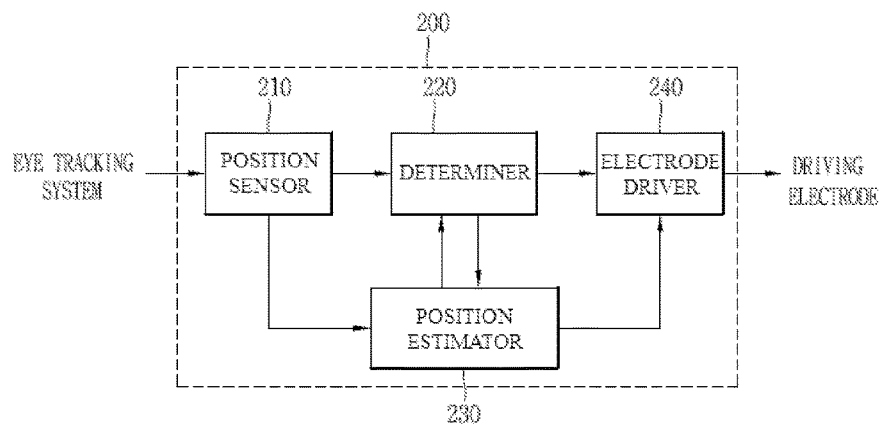
FIG. 9 is a view illustrating a structure of a controller according to an embodiment of the present invention.

FIG. 9 is a view illustrating a structure of a controller 200 according to an embodiment of the present invention.

The controller 200 is connected to an eye tracking system (or camera) and the driving electrodes 192 shown in FIG. 3, and drives the barrier electrodes 173 based on a result measured by the eye tracking system, thereby optimizing a barrier conversion.

As shown in FIG. 9, the controller 200 of the embodiment of the present invention includes a position sensor 210 configured to sense a past position and a current position of a user, based on user's eye tracking information input from the eye tracking system including a camera, a determiner 220 configured to determine whether to estimate a future position of the user, by sensing a moving speed of the user, etc., based on a sensing result by the position sensor 210, a position estimator 230 configured to estimate a future position of the user, based on information sensed by the position sensor 210, if it is determined by the determiner 220 that the future position of the user needs to be estimated, and an electrode driver 240 configured to drive the barriers of the parallax barrier, by applying a voltage to the barrier electrodes through the driving electrodes, based on an estimated position sensed by the position estimator 230.

In the eye tracking system, a user's eyes are captured by a camera, and the position sensor 210 senses a user's position based on data stored in the eye tracking system, and stores the user's position therein. When a user moves, the eye tracking system captures the moving user to sense a position of the user in real time. The user's information sensed in real time is stored in the position sensor 210.

The determiner 220 calculates a motion of the user based on the user's past position and current position sensed by the position sensor 210. Then, if a moving speed of the user is slower than an FPS of the camera, the determiner 220 determines the barriers to be driven in correspondence to a user's position sensed by the camera, without a position estimation. On the contrary, if the moving speed of the user is faster than the FPS of the camera, the determiner 220 determines a future position of the user to be estimated. Even in an instance where the moving speed of the user is slower than the FPS of the camera, the determiner 220 may drive the barriers in a sophisticated manner, by estimating a position of the user.

The position estimator 230 estimates a future position of the user, based on a past position and a current position of the user. In this instance, the position estimation is not executed by a specific method, but may be executed by various known methods.

The electrode driver 240 applies a voltage to the barrier electrodes 173 through the driving electrodes 192, according to a user's estimated position. In an instance where a single pitch of the parallax barrier (i.e., a width between a single transmitting region and a single blocking region) is composed of 8 barrier electrodes 173, a voltage application part among the 8 barrier electrodes 173 is changed for control of the barriers.

Hereinafter, a method for displaying a 3D image in the 3D display device according to an embodiment of the present invention will be explained with reference to the attached drawings.

Figure 10:
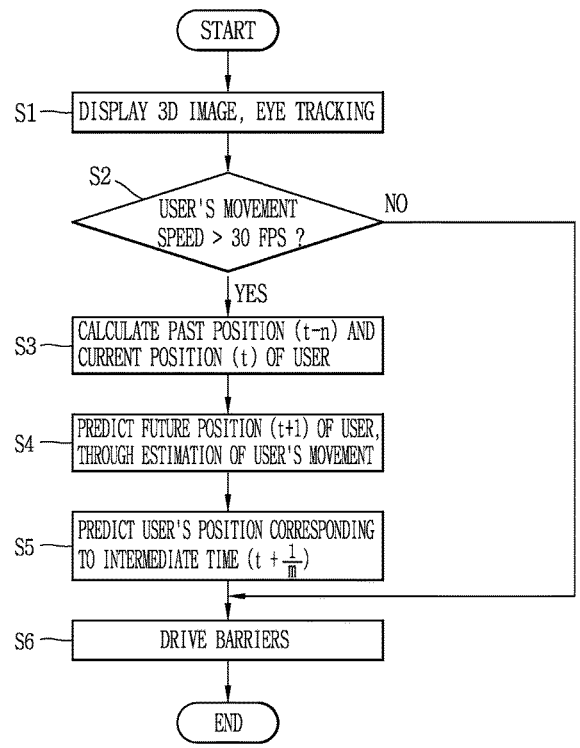
FIG. 10 is a flowchart illustrating a 3D image display method according to an embodiment of the present invention.

FIG. 10 is a flowchart illustrating a 3D image display method according to an embodiment of the present invention.

Firstly, the 3D display device displays a 3D image (S1). As shown in FIG. 3, in the 3D display device, the parallax barrier panel 100 is disposed on a front surface of the display panel 110 which outputs a left-eye image and a right-eye image by including left-eye pixels and right-eye pixels. With such a configuration, the left-eye images reach only a user's left eye, and the right-eye images reach only a user's right eye. As the two images are combined with each other, the user can recognize a 3D image.

If the user moves while the 3D image is being displayed, the camera installed at the 3D display device integrally or independently captures the user's eyes, thereby sensing an eye position of the user.

Then, a moving speed of the user is calculated based on the sensed position information on the user. If the user's moving speed is slower than an FPS of the camera, the barriers are driven as a voltage applied to the barrier electrodes is controlled in correspondence to the sensed user's position (S2).

If the user's moving speed is faster than the FPS of the camera, a past position of the user (t-n, 'n' is an integer) and a current position of the user (t) are calculated (S3). Then, a future position of the user (t+1) is estimated based on the calculated information (S4).

In this instance, a position estimation based on the user's moving speed is determined by the determiner 220 of the controller 200. The position estimation may be automatically executed according to a user's moving speed, or may be selectively executed according to a user's need. More specifically, when a user moves at a low speed without using the 3D display device, a non-position estimation mode is selected, since a position estimation is not required. On the other hand, when a user moves at a high speed with using the 3D display device, the user may directly select a position estimation mode.

Then, a position of the user, corresponding to an intermediate time (t+1/m, 'm' is an integer) between the current time and the future time (t+1), is sensed based on positions of the user which have been predicted at the current time and the future time (t+1) (S5). Then, the barriers are driven as a signal applied to the barrier electrodes 173 is controlled in correspondence to the sensed position corresponding to the intermediate time, so that a 3D image is implemented (S6).

As aforementioned, in the embodiment of the present invention, a user's future position is estimated, and when the user moves at a rapid speed, barriers are driven in correspondence to the estimated position. This can prevent occurrence of a moving flicker due to a brightness deviation.

In the embodiment of the present invention, disclosed are a parallax barrier panel of a specific structure, and a display device having the same. However, the embodiments of the present invention are not limited to this. That is, the embodiments of the present invention may be also applicable to all types of parallax barrier panels and display devices known to the public, only if a user's position can be estimated and a driving region of barrier electrodes to which a driving voltage is applied is controlled in correspondence to the estimated position.

As the features of the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A display device, comprising:
a display panel configured to display a left-eye image and a right-eye image;
a parallax barrier panel configured to block and transmit the left-eye image and the right-eye image so that the left-eye image and the right-eye image reaching a user's left-eye and right-eye, respectively, produces a 3D image;
a camera configured to sense the user's movement; and
a controller configured to calculate the user's moving speed by sensing a past position and a current position of the user sensed by the camera and implement the 3D image by estimating the user's future position based on the calculated user's moving speed when the calculated user's moving speed is faster than a frame per second (FPS) of the camera, and by applying a driving voltage to a barrier electrode according to the estimated future position,
wherein the controller is further configured to implement the 3D image by applying the driving voltage to the barrier electrode in correspondence to the current position of the user sensed by the camera when the calculated user's moving speed is slower than the frame per second (FPS) of the camera.

2. The display device of claim 1, wherein the parallax barrier panel comprises:
first and second substrates each including a blocking region and a transmitting region;
a liquid crystal layer between the first and second substrates;
a barrier electrode at the blocking region and the transmitting region of the first substrate;
a common electrode at the second substrate to apply an electric field to the liquid crystal layer together with the barrier electrode;
first and second alignment layers at the first and second substrates, respectively, and each alignment layer having an alignment direction; and
a polarizing plate on an upper surface of the second substrate, a direction of an optical axis of the polarizing plate being parallel to the alignment direction of the first alignment layer and the second alignment layer, thereby one of the left-eye image and the right-eye image are transmitted through one of the blocking region and the transmitting region where the electric field is not formed.

3. The display device of claim 2, wherein the barrier electrode is formed in plurality at the blocking region and the transmitting region.

4. The display device of claim 3, wherein the parallax barrier panel further includes driving electrodes for applying a driving voltage to the barrier electrodes.

5. The display device of claim 4, wherein the number of the driving electrodes is the same as the number of the barrier electrodes at a single blocking region and a single transmitting region, so that the driving electrodes correspond to the barrier electrodes disposed at pluralities of blocking regions and transmitting regions.

6. The display device of claim 5, wherein when the user moves, the blocking regions and the transmitting regions are moved, as a voltage application region among the driving electrodes is changed and a voltage application region among the barrier electrodes is changed.

7. The display device of claim 1, wherein the controller comprises:
a position sensor configured to sense the past position and the current position of the user, based on information input from the camera;
a position estimator configured to estimate the user's future position, based on information sensed by the position sensor; and
an electrode driver configured to move blocking regions and transmitting regions of the parallax barrier panel by applying a voltage to barrier electrodes of the parallax barrier panel.

8. The display device of claim 7, wherein the user's future position is estimated by a selection of the user.

9. The display device of claim 7, wherein the controller further comprises a determiner configured to determine whether to estimate the user's future position, based on a sensing result by the position sensor.

10. The display device of claim 7, wherein a position estimation time of the user is shorter than the frame per second (FPS) of the camera.

11. The display device of claim 1, wherein the display panel includes one of a liquid crystal panel, an electrophoretic display panel, and an organic light emitting display panel.

12. The display device of claim 1, wherein the controller comprises:
a position sensor configured to sense the past position and the current position of the user, based on eye tracking information from the camera;
a determiner configured to determine whether to estimate the user's future position, by sensing the user's moving speed, based on a sensing result by the position sensor;
a position estimator configured to estimate the user's future position, based on information sensed by the position sensor, when it is determined by the determiner that the user's future position needs to be estimated; and
an electrode driver configured to drive barriers of the parallax barrier panel based on the estimated user's future position estimated by the position estimator.

13. The display device of claim 12, wherein, when the user moves, the camera captures the moving user to sense a position of the user in real time.

14. The display device of claim 12, wherein the determiner calculates a motion of the user based on the past position and the current position of the user sensed by the position sensor,
- when the user's moving speed is slower than the frames per second (FPS) of the camera, the determiner drives the barriers in correspondence to the user's position sensed by the camera, without a position estimation, and
- when the user's moving speed is faster than the FPS of the camera, the determiner determines the user's future position to be estimated.

15. The display device of claim 14, wherein the determiner alternately drives the barriers by estimating the user's position even when the user's moving speed is slower than the FPS of the camera.

16. A display method, comprising:
- displaying a 3D image by using a parallax barrier panel disposed on a front surface of a display panel that outputs a left-eye image and a right-eye image from left-eye pixels and right-eye pixels so that the left-eye image reaches only a user's left eye, and the right-eye image reaches only the user's right eye;
- detecting a movement of the user's eyes using a camera to sense a position of the user; and
- calculating the user's moving speed based on a past position and a current position of the user sensed by the camera,
- wherein, when the user moves at a lower speed than a frame per second (FPS) of the camera, a non-position estimation mode of the display panel is selected,
- wherein, when the user moves at a higher speed than the FPS of the camera, a position estimating mode of the display panel is selected to estimate the user's future position according to the user's moving speed,
- wherein, when the user's moving speed is slower than the FPS of the camera, barriers of a parallax barrier panel are driven in correspondence to the current position of the user, and
- wherein, when the user's moving speed is faster than the FPS of the camera, the barriers of the parallax barrier panel are driven according to the estimated user's future position.

17. The display method of claim 16, wherein a position of the user, corresponding to an intermediate time between the current time and the future time is sensed based on positions of the user which have been predicted at the current time and the future time.

18. The display method of claim 17, wherein the barriers are driven in correspondence to the sensed position corresponding to the intermediate time.

* * * * *